United States Patent [19]

Sheppard et al.

[11] 3,868,359

[45] Feb. 25, 1975

[54] SYMMETRICAL TRISAZO SEQUENTIAL FREE RADICAL INITIATORS HAVING TWO DIFFERENT AZO FUNCTIONS

[76] Inventors: Chester Stephen Sheppard, 726 Parkhurst Blvd., Tonawanda, N.Y. 14150; Ronald Edward MacLeay, 10 Mahogany Dr., Williamsville, N.Y. 14221

[22] Filed: Feb. 22, 1972

[21] Appl. No.: 228,242

Related U.S. Application Data

[62] Division of Ser. No. 752,752, Aug. 15, 1968, Pat. No. 3,649,614.

[52] U.S. Cl. ............ 260/173, 260/86.1, 260/93.7, 260/152, 260/153, 260/157, 260/169, 260/174, 260/192, 260/873, 260/878
[51] Int. Cl. ...C07c 107/02, C07c 107/04, C08f 19/10
[58] Field of Search .......... 260/174, 192, 152, 156, 260/169, 173

[56] References Cited
UNITED STATES PATENTS

| | | | |
|---|---|---|---|
| 2,554,141 | 5/1951 | Flory et al. | 260/144 |
| 3,244,692 | 4/1966 | Ham | 260/154 |
| 3,428,583 | 2/1969 | Lasman | 260/174 X |
| 3,629,227 | 12/1971 | Meckel et al. | 260/174 |
| 3,642,751 | 2/1972 | Logemann et al. | 260/192 X |
| 3,649,614 | 3/1972 | Sheppard et al. | 260/174 |

OTHER PUBLICATIONS

Rabjohn, J. Am. Chem. Soc., Vol. 70, p. 1181–1183, (1948).

*Primary Examiner*—Floyd D. Higel

[57] ABSTRACT

Polyazo compounds having at least one azo function different from the other azo function(s).

Examples:
  4-Ethoxycarbonylazo-4-cyanopentyl 4-t-butylazo-4-cyanovalerate;
  2,2'-Azobis[2-(4-t-butylazo-y-cyanovaleroyloxy)-4-methylpentane].

Organic syntheses requiring free radical generation in two stages are carried out using as the source of sequential free radicals a polyazo compound, as defined, wherein at least one azo function is ruptured in the first stage and the remaining azo function(s) are ruptured in the second stage.

Example: Styrene monomer and 4-ethoxycarbonylazo-4-cyanopentyl 4-t-butylazo-4-cyanovalerate were reacted at about 76°C. to obtain a polystyrene containing functional azo groups. The polystyrene-azo polymer was reacted with methyl methacrylate monomer at 130°C. to obtain a block copolymer of polystyrene and poly(methyl methacrylate).

5 Claims, No Drawings

SYMMETRICAL TRISAZO SEQUENTIAL FREE RADICAL INITIATORS HAVING TWO DIFFERENT AZO FUNCTIONS

This is a division of application Ser. No. 752,752, filed Aug. 15, 1968, now U.S. Pat. No. 3,649,614 issued Mar. 14, 1972.

BACKGROUND OF THE INVENTION

1. The Field of the Invention

This invention relates to new polyazo compounds wherein at least two different azo functions are present. Also the invention relates to a method of providing free radicals in sequence wherein a novel polyazo compound, as defined, is used as the source of sequential free radicals. More particularly the invention relates to the preparation of vinyl polymers containing functional azo groups and to block copolymerization using such vinyl-azo polymers.

2. The Prior Art

Compounds having more than one azo function have been reported but in all cases the azo functions are identical. Sequential free radical generation would not be observed with the prior art compounds. Such prior art is reported in: U.S. Pat. No. 2,554,141; U.S. Pat. No. 3,244,692; Neugebauer et al, Ann. 706, 107 (1967); Bellamy et al, J. Chem. Soc. C, 1966, 1989; Easer et al, Gummi 11, WT 57-62 (1958).

SUMMARY OF THE INVENTION

The novel polyazo compounds are represented by the general formula: $I.(C-N=N-A-B-)_n X$ where when $n = 1$, X is the monoradical $-A'-N=N-C'$ and when $n = 2$, X is the diradical $A'-N=N-A'$. In an alternative presentation the novel polyazo compounds fall within one or the other of the following general formulas I' and I''

(I'.) $C-N=N-A-B-A'-N=N-C'$, and (I''.) $C-N=N-A-B-A'-N=N$
$N-A'-B-A-N=N-C$, where 1. C and C' are monovalent radicals selected from the class consisting of

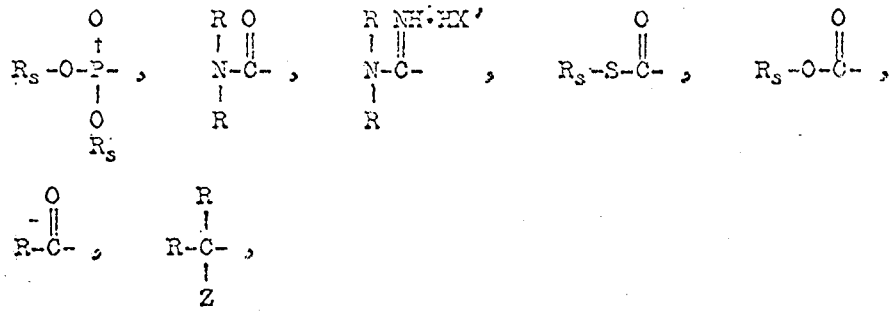

aliphatic, aromatic, and heterocyclic;

2. C and C' are different and may be the same when A and A' are different;

3. A and A' are biradicals selected from the class consisting of

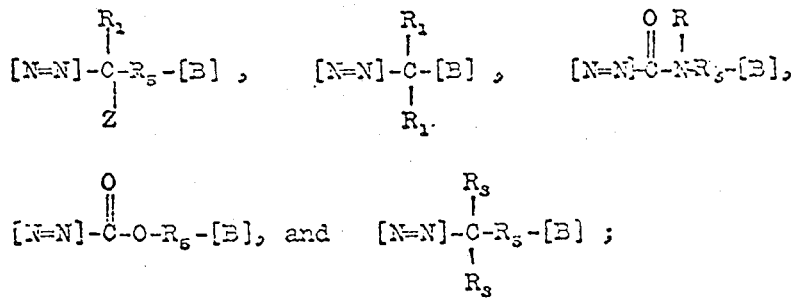

4. A and A' are different, and may be the same when C and C' are different in I', and may be the same when A and C are different in I'';

5. B is a biradical selected from the class consisting of

$-O-$, $-S-$, $-R_5-$, and a direct bond;

6. X' is an inorganic anion;

7. Z is a monovalent radical selected from the class consisting of

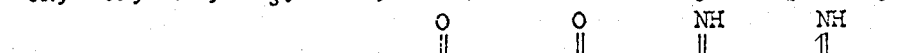
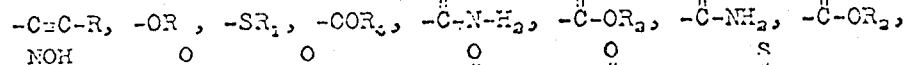
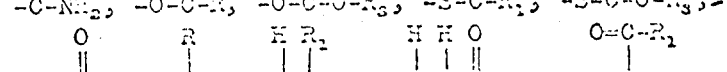
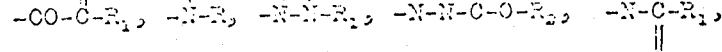
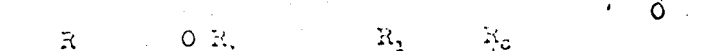
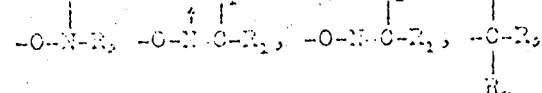
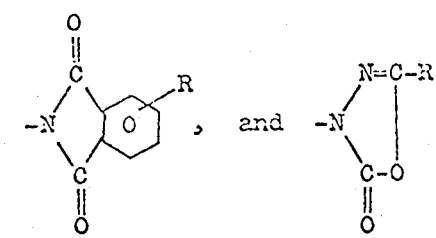

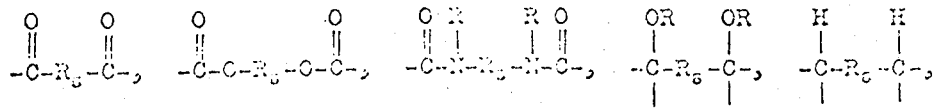

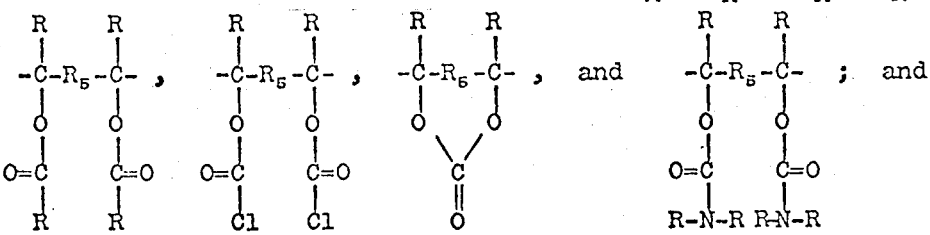

8. R is a hydrogen, aliphatic, cycloaliphatic, aromatic, or heterocyclic radical;
9. $R_1$ is an aliphatic, cycloaliphatic, aromatic or heterocyclic radical;
10. $R_2$ is a lower alkyl radical;
11. $R_3$ is an aliphatic, cycloaliphatic or aromatic radical;
12. $R_4$ is a tertiary aliphatic radical;
13. $R_5$ is an aliphatic, cycloaliphatic, or aromatic biradical;
14. $R_6$ and $R_7$ individually are monovalent radicals selected from the class consisting of

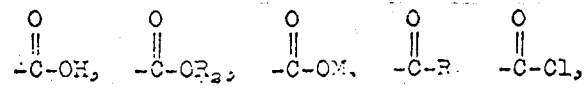 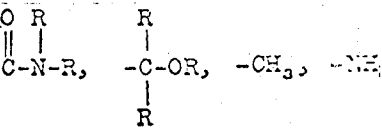

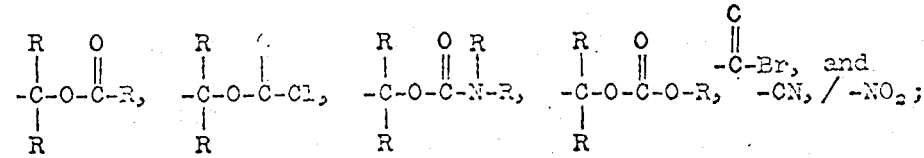

15. $R_6$ and $R_7$ taken together are biradicals selected from the class consisting of 16. M is an ion selected from the class consisting of alkali metal, alkaline earth metal, and $-NH_4$.

Another aspect of the invention is a method of preparing a block polymer which method consists essentially of: (1) forming a polymer having azo functions present by reacting vinyl monomer and a polyazo compound I under vinyl polymerization conditions, controlling conditions in order to cause one azo function to rupture leaving another azo function intact, said rupture of the one azo function having the effect of initiating said polymerization; and (2) reacting, vinyl-type monomer with the polymer of step (1) under conditions to rupture the azo-carbon linkages of said step (1) polymer to produce a block polymer product.

Example: (1) reacting styrene with an initiating amount of the ester of 2-hydroxyethyl t-butylazocarboxylate and 4-t-butylazo-4-cyanovaleryl chloride in a nitrogen atmosphere at 65°C for about 10 hours; and (2) reacting methyl methacrylate with the azo containing polystyrene of step (1) in a nitrogen atmosphere at 130°C for about 3 hours to obtain a polystyrene-poly(methyl methacrylate) block polymer.

DESCRIPTION OF THE INVENTION AND WORKING EXAMPLES

The Polyazo Compounds

The novel azo compounds are defined in I supra, and alternatively in I' and I''. In the formula aliphatic and cycloaliphatic are used in their broadest technical meaning; however, it is to be understood that substituents which may be present in the aliphatic or cycloaliphatic radical must be inert to the azo functions, so as not to interfere with the preparation reaction(s). Commonly the aliphatic radical will have 1–36 carbon atoms, usually 1–22, and the cycloaliphatic radical will have 3–12 ring carbon atoms, usually 4–8, in a single ring compound and 5–24 ring carbon atoms, usually 6–12, in a doubled or fused ring radical. It is to be understood that both aliphatic and cycloaliphatic may be substituted with aromatic group(s).

Aromatic is used in its broadest technical meaning and includes a single benzoid ring, doubled (and higher) rings, and fused rings. These may be substituted with groups which are inert to the azo functions or by one or more non-aromatic rings, including fused rings. Commonly these are phenyl, naphthyl and biphenyl radicals.

Heterocyclic is used in its broadest technical meaning of a ring made up of carbon atoms and at least one other atom, such as oxygen, sulfur and nitrogen. Substituents in the ring are inert to the azo functions.

The above definitions are broad and intentionally so because the defined R's and Z's appearing in the radical definitions of the azo compounds of Formula I do not affect the general utility of the compounds or the ability to make the compound by the processes set forth herein. Numerous compounds coming within Formula I are set out in the working examples.

A tertiary aliphatic radical is one where the free valence is associated with a carbon atom which is joined directly through its other valences with three other carbon atoms, for example, a t-butyl radical.

Lower alkyl is intended to have about 1–12 carbon atoms and usually 1–8 carbon atoms, preferably 1–6 carbon atoms. Alkyl, Alkenyl, and Alkynyl: Each alkyl group may include 1 or more carbon atoms. Desirably each has 1–22 carbon atoms.

Cycloalkyl and cycloalkenyl: May be single ring or have two or more fused rings. Desirably the single ring has in the ring 3–12 carbon atoms, and preferably 5–8 carbon atoms. Preferably the total number of carbon atom in the radical is 5–12. Cyclopentyl, cyclohexyl, and the radical corresponding to decalin are preferred radicals.

Aryl:

May be a single benzene ring, or a doubled or higher system, e.g. biphenyl, terphenyl, quaternaphthalene, or a fused benzene ring system, e.g. naphthalene, anthracene, phenanthrene, or an alkane bridged system, e.g., biphenylmethane, biphenylpropane. Phenyl, biphenyl, naphthalyl and the alkyl substituted radicals are preferred.

Aralkyl:

The "Ar" portion of the radical may be as in "Aryl". The "alkyl" portion has desirably 1–12 carbon atoms and preferably 1–6 carbon atoms.

The preferred definitions of R's

R is H, alkyl, alkenyl, aralkyl, cycloalkyl, phenyl, naphthyl, or heterocyclic having carbon and at least one O, S, or N in the ring.

$R_1$ is alkyl, alkenyl, aralkyl, cycloalkyl, phenyl, naphthyl, or heterocyclic having carbon and at least one O, S, or N in the ring.

$R_3$ is alkyl, alkenyl, aralkyl, cycloalkyl, phenyl, or naphthyl.

$R_4$ is t-alkyl, t-alkenyl or t-aralkyl.

$R_5$ is a divalent radical of saturated, ethylenically unsaturated or acetylenically unsaturated aliphatic or cycloaliphatic hydrocarbons, or benzene or naphthalene hydrocarbons or biphenyl hydrocarbons.

It is to be understood that the above preferred definitions include the carbon atom limitations previously set out with respect to the various R's.

X' is an inorganic anion. Anions derived from the mineral acids are preferred. Illustrative are F—, Cl—, Br—, $HSO_4$—, $SO_4$=, $H_2PO_4$—, $HPO_4$=, $PO_4$≡, $ClO_3$—, $ClO_4$—, CN—, $NO_3$—, $NO_2$—, $SO_3$=, and $CO_3$=.

M is alkali metal, alkaline earth metal or ammonium ($NH_4^+$). Illustrative are: Li, Na, K, Ca, Sr and Ba.

Any compound which contains more than one azo group (excluding diaromatic azo groups) and at least two of the azo groups vary in their physical or chemical properties will be capable of sequential free radical initiation. The preparations of some typical such compounds are given in Example I to XIII. The following are a few of the many other such compounds that are capable of sequential free radical generation according to the present invention:

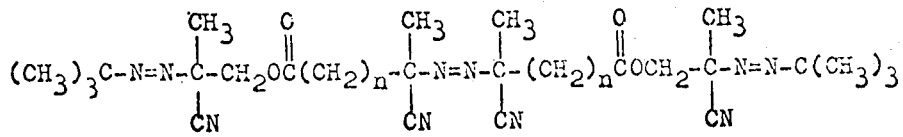

1.

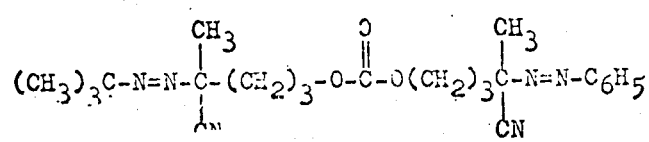

2.

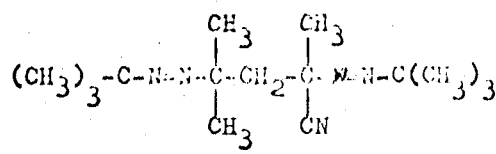
3.
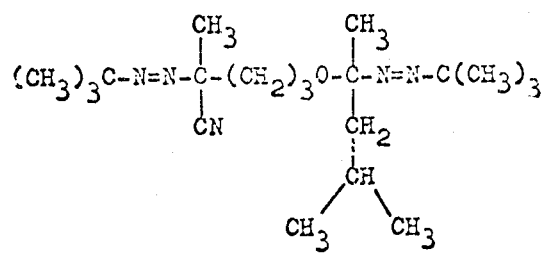
4.
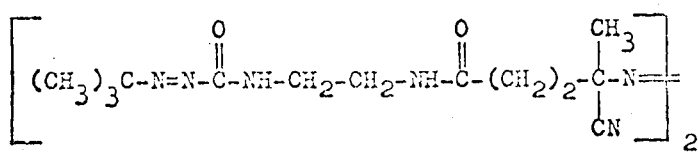
5.
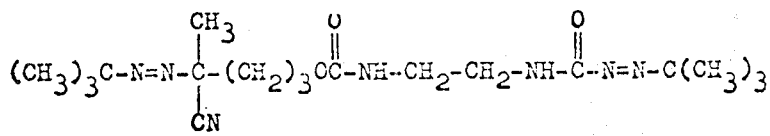
6.
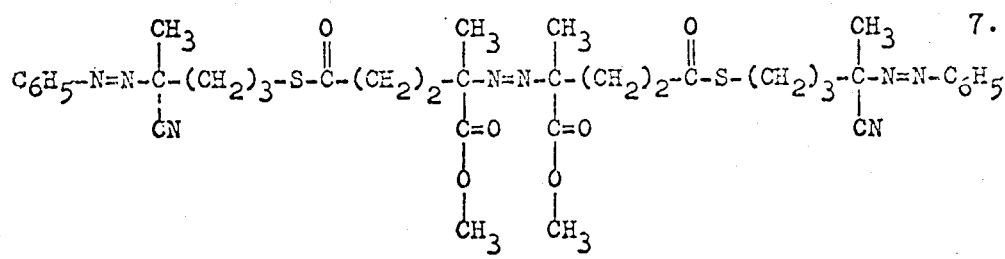
7.
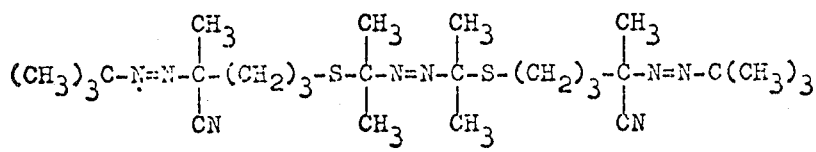
8.
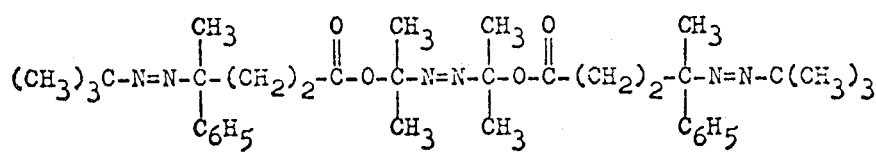
9.
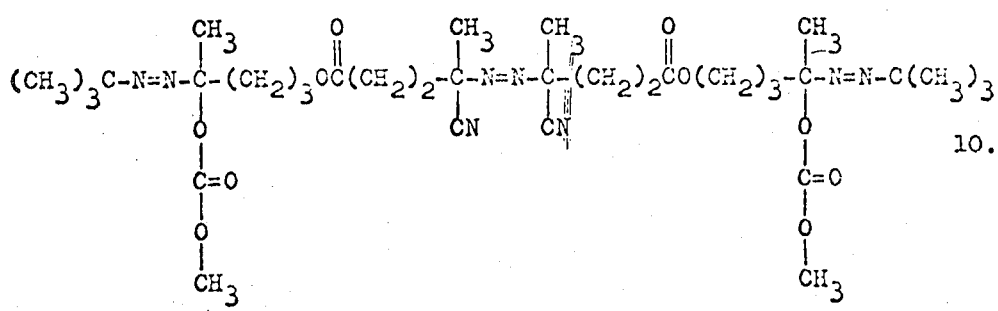
10.

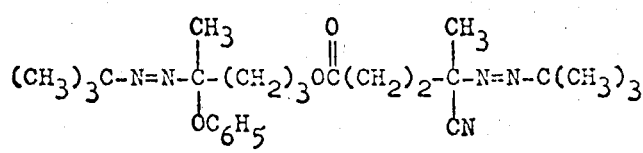  11.
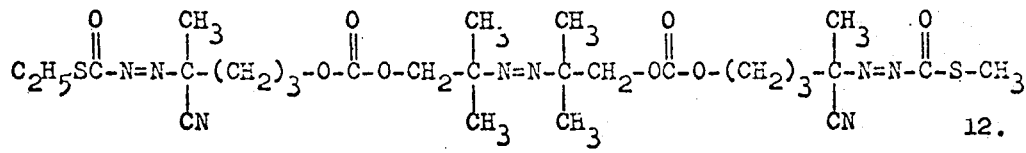  12.
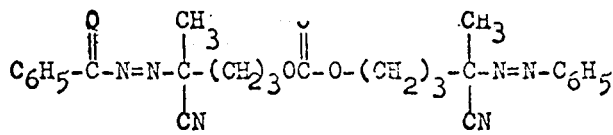  13.
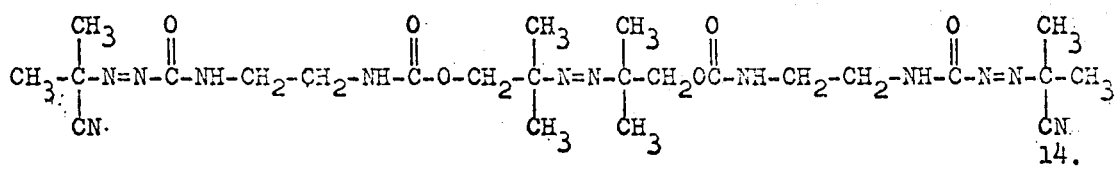  14.
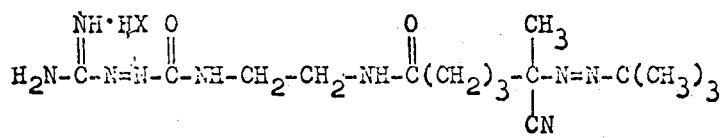  15.
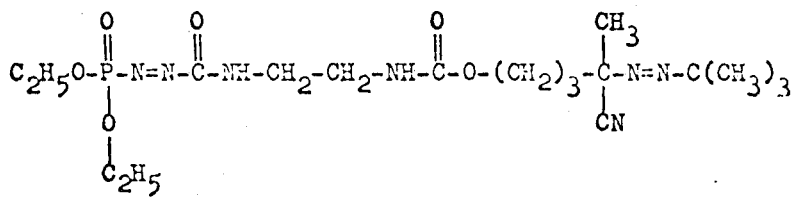  16.
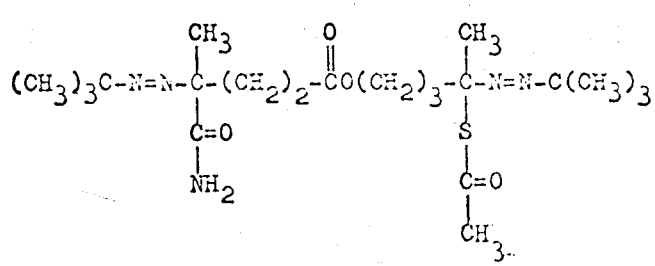  17.
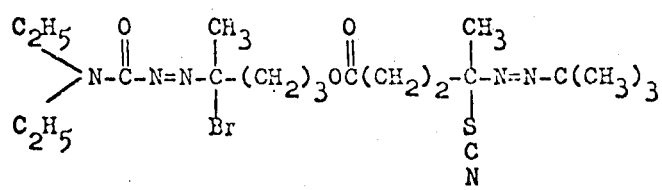  18.
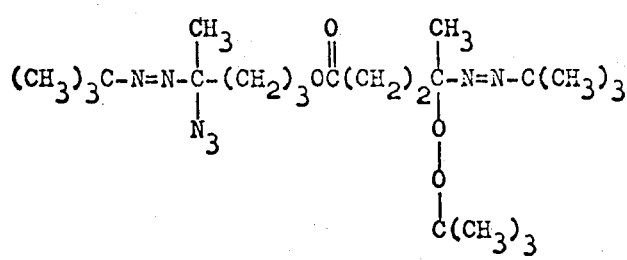  19.

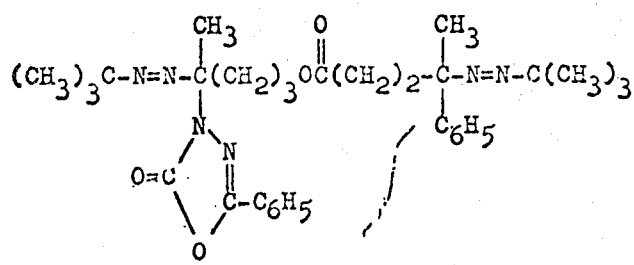 20.
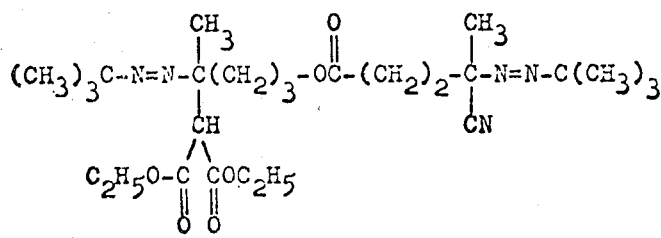 21.
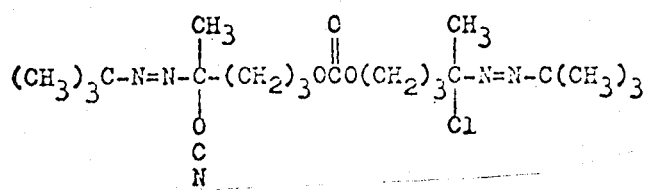 22.
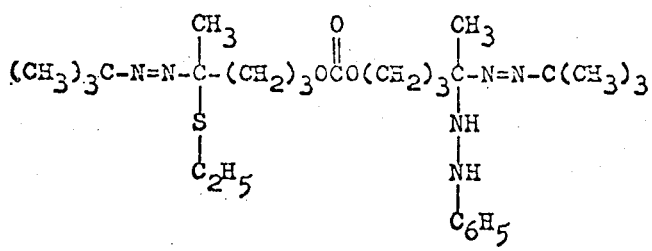 23.
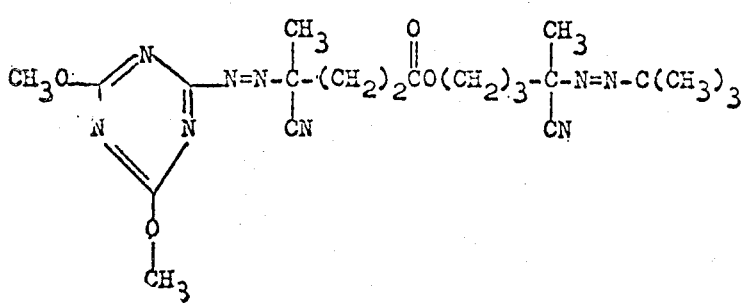 24.
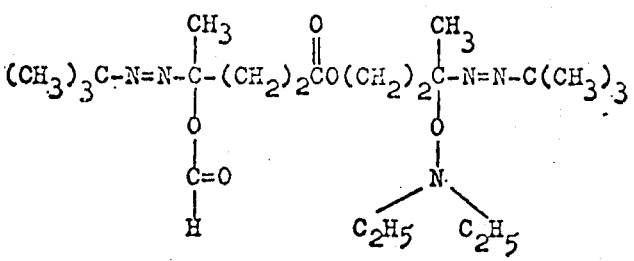 25.
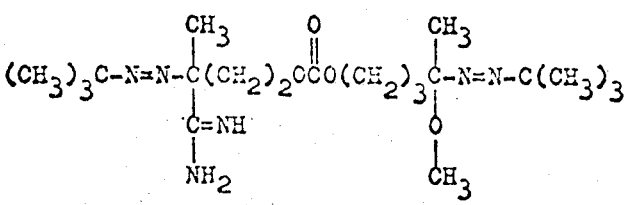 26.

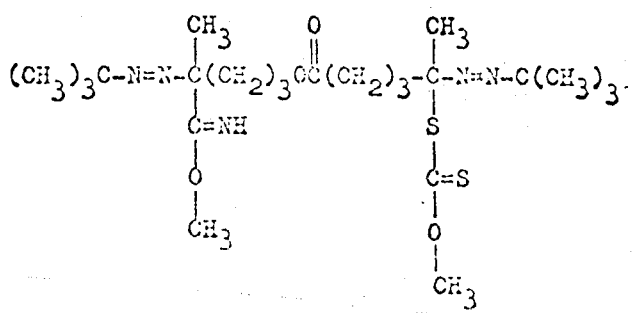 27.
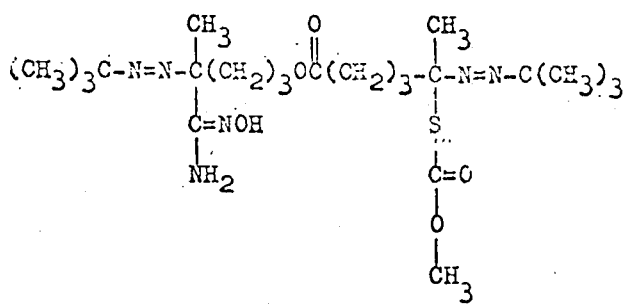 28.
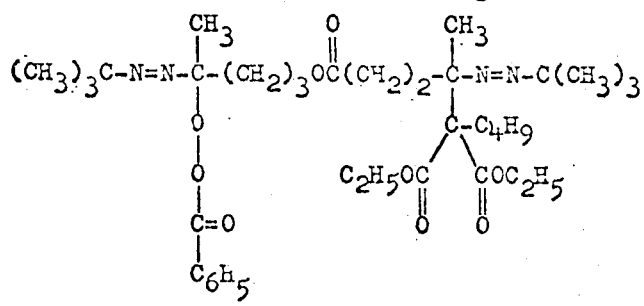 29.
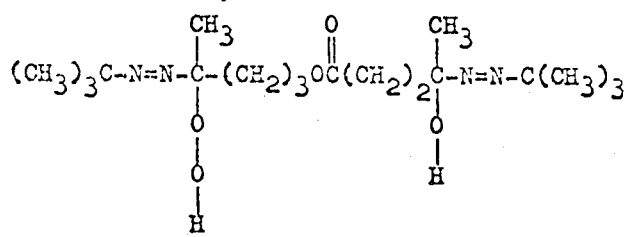 30.
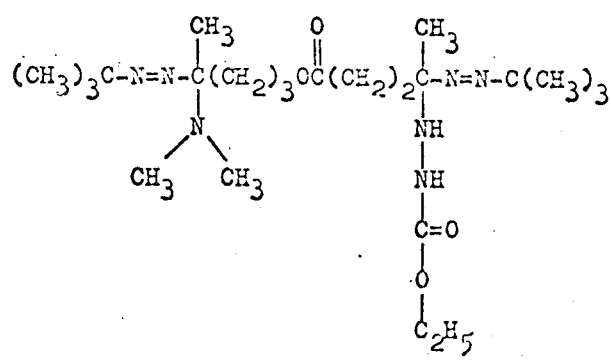 31.
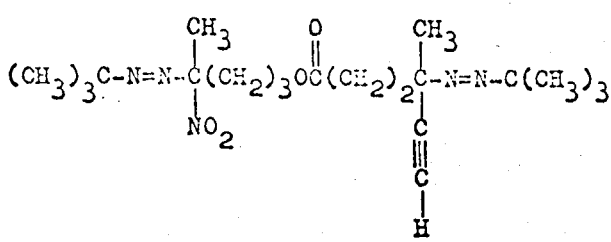 32.

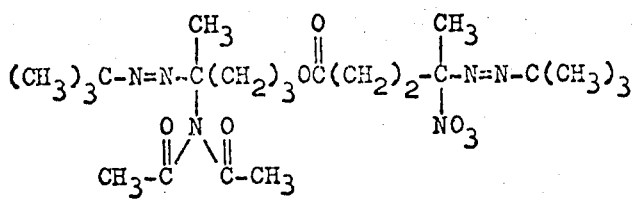 33.
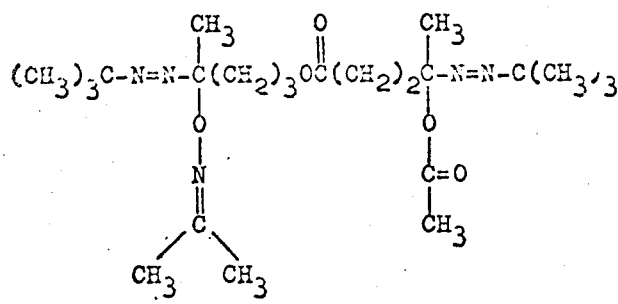 34.
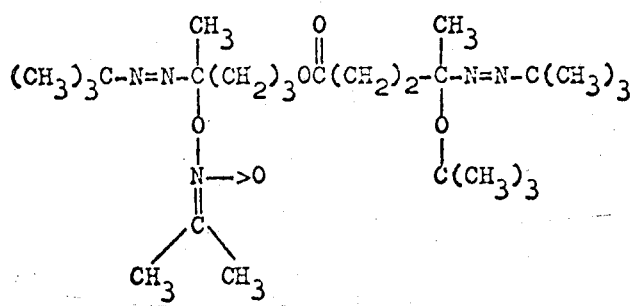 35.
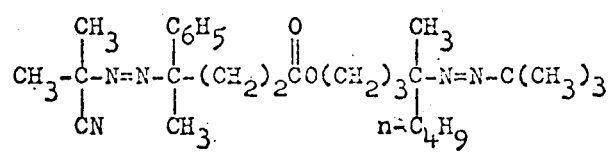 36.
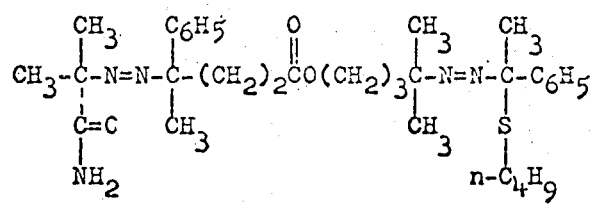 37.
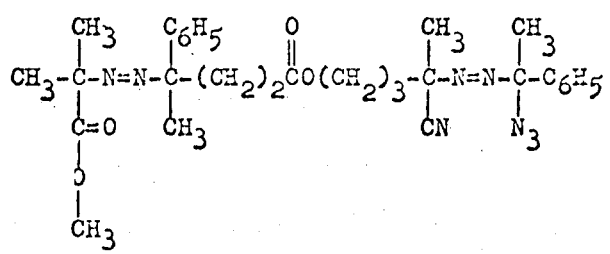 38.
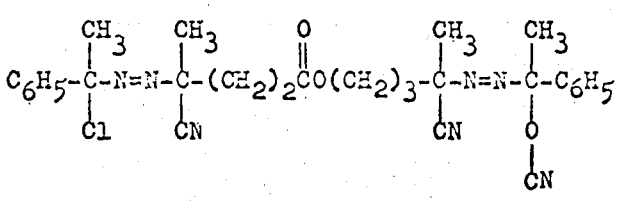 39.

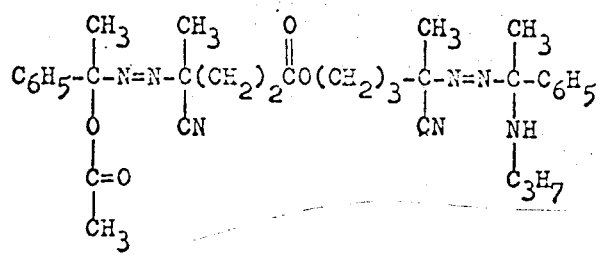

Utility

The polyazo compounds of this invention may be used in any operation or reaction requiring free radicals such as: in organic syntheses, either as free radical reactants or initiators; polymerization of vinyl monomers to form either homopolymers or copolymers; flame retardant synergists with bromine compounds for polymers such as polystyrene; curing agents or cross-linking agents for elastomers such as natural and synthetic rubbers, silicone gums, polyolefin copolymers, and the like; and curing agents for thermosetting resins such as unsaturated polyester-vinyl monomer blends, polyolefins and the like.

The polyazo compounds of this invention evolve considerable amounts of gases, such as nitrogen, upon decomposition and are therefore also useful as blowing or foaming agents for preparing foamed polymers.

The polyazo compounds of this invention that contain a carbonyl group directly linked to one or more of the azo nitrogens are also useful as selective oxidizing agents and as chemical reactants. These types of azo compounds contain reactive azo groups that are dienophiles in Diels Alder reactions and to which many compounds containing active hydrogen atoms can be added.

The preferred use of the polyazo compounds of this invention is for the sequential generation of free radicals. An especially preferred use is polymerization of vinyl monomers in sequence to form first, an azo-containing polymer and subsequently, by polymerizing further with other vinyl monomers, block copolymers.

The azo function on the azo-containing polymer initially formed above can also be used to generate a free radical site on the polymer for other applications such as: crosslinking, grafting, adhesion, lamination, and attaching other functions to the polymer which would impart desirable properties such as dyeability; antistatic; and light, heat and/or oxidative stability.

Such azo-containing polymers can be stored, shipped and handled prior to the subsequent operation for any length of time desired provided that the polymer is not subjected to conditions that will cause the azo function to decompose or rupture prematurely.

Sequential generation of free radicals is also useful in other applications such as in the homopolymerization of monomers such as styrene and ethylene.

Another application is to use one or more of the azo functions to gel a resin such as an unsaturated polyester-vinyl monomer blend and to use the other azo function(s) to subsequently cure the resin.

Other applications for sequential free radical generation from the novel polyazo compounds of this invention will become apparent to those skilled in the art.

Methods of Polymerization

The method inventions are directed to the use of compounds of the invention to prepare block polymers by a sequential procedure wherein a compound I is used to initiate vinyl polymerization to prepare a polymer including an azo function as a part of the polymer. The azo containing polymer is then further polymerized with vinyl monomer under conditions to rupture the azo function whereby the block polymer is formed. These novel compounds are useful as sequential free radical generators, i.e. one or more of the azo groups can be preferentially decomposed to generate free radicals for a particular application (e.g. vinyl monomer polymerization) keeping at least one azo group substantially undecomposed for a later application (e.g. formation of a block copolymer with another vinyl monomer polymerization) and vice-versa. These sequential and/or preferential decompositions of the azo portions of the molecule can be accomplished for example by taking advantage of the difference in the thermal rates of decomposition of the various azo portions of the molecule. A second method, also based on the different thermal rates of decomposition is to use the same temperature but different reaction times.

A third method would be to decompose the azos photolytically taking advantage of the difference in wavelength of the ultraviolet maximum for conjugated and nonconjugated azos. This technique would require that at least one of the azo groups is conjugated and at least one of the azo groups is not conjugated. A fourth method would be to decompose at least one of the azos photolytically, taking advantage of the difference in wavelength of the ultraviolet maximum for conjugated and nonconjugated azos, and then decompose the other azo(s) thermally or vice-versa. Again this method requires a difference in the wavelengths of ultraviolet absorption. A fifth method would be to activate an azoester or azoamide portion of the molecule with a Lewis acid and then decompose the other azo(s) thermally or photolytically in a second step or vice-versa. A sixth method would be to activate an azoester or azoamide portion of the molecule by hydrolysis and then decompose the other azo(s) thermally or photolytically in a second step or vice-versa. The last two methods require that at least one of the azo groups is an azoester or an azoamide and that at least one of the azo groups is not an azoester or an azoamide.

Thus, by taking advantage of the differences in the physical and chemical properties of the azo groups contained in the novel di- or polyazo compound of structure I, a variety of techniques can be used for sequential free radical generation.

Sequential free radical generation is very useful in the vinyl polymerization field. Block copolymers can be made from any combination of polymerizable vinyl monomers. Sequential free radical generation is also employed in the conventional polymerization of ethylene and styrene. The present art accomplishes this by using two or more polymerization initiators of different thermal stability.

Conventional polymerization techniques, i.e. bulk, solution, suspension or emulsion polymerization, can be used. The choice will depend upon the normal reasons for choosing one technique over another e.g. water and oil solubility of the monomer and/or initiator; desired molecular weight range of the polymer; temperature (or exotherm) control, etc.

The temperatures at which the polymerizations are carried out will depend upon the polymerization technique; the monomer, solvent or suspending medium; and the physical properties desired in the polymer; but most of all upon the sequential azo initiator and the method chosen to decompose the various azo portions of the initiator. Activation of azo esters and azo amides with Lewis acids can be used to lower their decomposition temperatures to room temperature. Activation of azo esters by hydrolysis can be used to lower their decomposition temperatures to the freezing point of the aqueous solution. The decomposition rates of the various azo groups upon exposure to ultraviolet irradiation will be dependent upon the wavelength of the ultraviolet source. Conjugated azos such as azo esters and azo amides absorb ultraviolet light much stronger and absorb at a higher wavelength than the aliphatic azos. Consequently the conjugated azos can be preferentially decomposed in the presence of the aliphatic azo by using a wavelength corresponding to the wavelength of the ultraviolet maximum for the conjugated azo or vice versa.

The temperatures used for the thermal decompositions of the various azo portions of the initiator will depend upon the thermal stability (half-life) of the various azo groupings in the molecule. These half-lives may be determined quantitatively for each sequential azo initiator by conventional methods, i.e. gas evolution, ultra-violet or gas chromatographic analytical techniques, to determine the rate of disappearance of each azo group at any given temperature. However it is not necessary to accurately determine the half-like of each portion since most half-lives can be predicted, within a few degrees, from the analogous monomeric azo compounds. Some ten-hour half-life temperature ranges of some typical azo structures are given in Table I. More accurate data is available on the individual compounds where R, R' and R'' are known and such data was used to estimate the ten-hour half-lives on the compounds prepared in Examples I to XIII.

All the vinyl monomers listed can be polymerized by azo initiators. Azo initiators are commonly used in all four free-radical polymerization techniques. It is old in the art to initiate polymerization of vinyl monomers with azo initiators by irradiating the monomer-initiator solution with an ultraviolet source. It is also old in the art to activate azo esters and amides with Lewis acids.

Table I

Ten-Hour Half-Life Temperatures of Various Azo Compounds

| General Structure | | 10 Hour $t_{1/2}$ Range °C |
|---|---|---|
| $R-\underset{\underset{CN}{\mid}}{\overset{\overset{R'}{\mid}}{C}}-N=N-\underset{\underset{CN}{\mid}}{\overset{\overset{R'}{\mid}}{C}}-R$ | $R = R' = CH_3$ | 65 |
| | $R = CH_3 \quad R' = i\text{-}C_4H_9 \quad O$ | 52 |
| | $R = CH_3 \quad R' = CH_2\text{-}CH_2\text{-}COR''$ | 65 |
| $(CH_3)_3C-N=N-\underset{\underset{CN}{\mid}}{\overset{\overset{R}{\mid}}{C}}-R'$ | $R = R' = CH_3$ | 79 |
| | $R = CH_3 \quad R' = i\text{-}C_4H_9 \quad O$ | ~70 |
| | $R = CH_3 \quad R' = CH_2\text{-}CH_2\overset{O}{\overset{\|}{C}}R''$ | 76-79 |
| | $R = CH_3 \quad R' = CH_2O\overset{O}{\overset{\|}{C}}R''$ | 77-80 |
| $R-\underset{\underset{\underset{\underset{CH_3}{\mid}}{\underset{C=O}{\mid}}}{\underset{O}{\mid}}}{\overset{\overset{R'}{\mid}}{C}}-N=N-\underset{\underset{\underset{\underset{CH_3}{\mid}}{\underset{C=O}{\mid}}}{\underset{O}{\mid}}}{\overset{\overset{R'}{\mid}}{C}}-R$ | $R = R' = CH_3$ | 162 |
| $(CH_3)_3C-N=N-\overset{O}{\overset{\|}{C}}OR$ | $R = i\text{-}C_3H_7$ | ~130 |
| $R''O\overset{O}{\overset{\|}{C}}-N=N-\underset{\underset{CN}{\mid}}{\overset{\overset{R}{\mid}}{C}}-R'$ | $R = CH_3 \quad R' = (CH_2)_3OH \quad R'' = C_2H_5$ | ~130 |
| $(CH_3)_3C-N=N-\overset{O}{\overset{\|}{C}}-NH_2$ | | 105 |
| $C_6H_5-N=N-\underset{\underset{CN}{\mid}}{\overset{\overset{CH_3}{\mid}}{C}}-CH_3$ | | ~130 |
| $CH_3-\underset{\underset{CN}{\mid}}{\overset{\overset{CH_3}{\mid}}{C}}-N=N-\overset{O}{\overset{\|}{C}}-NH_2$ | | 107 |

Table I Cont'd

Ten-Hour Half-Life Temperatures of Various Azo Compounds

| General Structure | | 10 Hour $t_{\frac{1}{2}}$ Range °C |
|---|---|---|
| 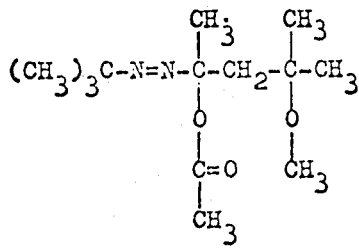 | | 105 |
| 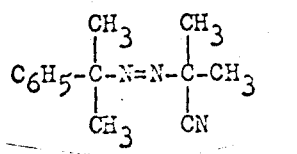 | R = $CH_3$  R' = $i-C_4H_9$ | 90 |
| 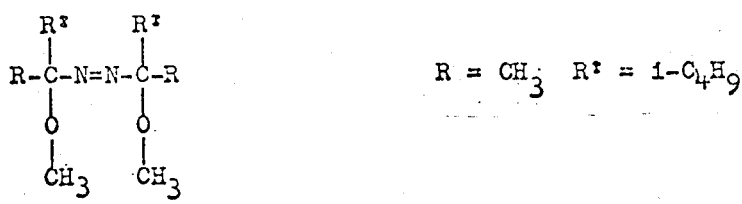 | | 55 |

The expression "vinyl monomer" includes all those organic compounds containing at least one $$CH_2=C<$$

group in their molecule. Examples of these monomers are styrene, ethylene alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; vinyl esters of the inganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adiphate, methallyl propionate, allyl chloride, methallyl chloride ally acrylate, methallyl methacrylate, and dienes such as butadiene and chloroprene.

Azo initiators are also effective initiators for the copolymerization of the above-described compounds with each other or with other types of polymerizable organic compounds, particularly those containing at least one ethylenic linkage, such as the saturated esters and polyesters of the unsaturated acids, such as the maleates, fumarates, crotonates, and the like.

Other method inventions are directed to the use of the novel compounds of the invention to gel and cure a resin such as an unsaturated polyester-vinyl monomer blend by a sequential procedure wherein one or more like azo functions of a compound I are preferentially decomposed to cause the the resin to gel and subsequently decomposing the remaining azo functions thereby causing the gelled resin to be cured to a hard thermoset. This allows for intermediate storage, shaping, and handling of the gelled resin before curing, e.g. as in matched metal die molding.

Gelling resins, such as unsaturated polyestervinyl monomer blends with free radical initiators, without curing, can be accomplished in several ways: 1) Using initiators that will gel but not cure the resin; 2) Using very low concentrations of initiators; 3) Using and controlling temperatures below those normally used for optimum curing; and 4) Using free radical scavengers, e.g. excessive amounts of antioxidants, which diminish the efficiency of the initiator and prevent curing of the resin. By the judicious choice of the polyazo compound and the gelling and curing conditions, the polyazo compounds of the invention may be used for sequentiall gelling and curing resins such as unsaturated polyester-vinyl monomer blends.

For example, it has been found that certain azo structures, e.g. those containing a hydroxyl group attached directly to the carbon atom bearing the azo nitrogen atom, will gel, but not cure, an unsaturated polyester-vinyl monomer resin blend at relatively low temperatures. Compounds containing this type of functional group in conjunction with another azo structure which will cure the polyester resin blend, such as the compound of Example XIX and compounds 43 and 44, can be used in this particular application.

Unsaturated polyester-vinyl monomer resin blends containing the usual fillers, extenders, or reinforcing agents used by the art, such as in polyester premix or prepreg materials may be used with the polyazo compounds of this invention.

The improvement of the method invention is that both the gelling and the curing portions of the complete initiator system is provided in a single compound, namely one of the novel polyazo compounds of the invention. Previously, two separate and distinct initiator systems had to be used, one for gelling and the other for curing. In some cases a single initiator is used and the process is interrupted at the gelled stage by cooling, wherein the initiator is only partly decomposed and subsequently cured with the remaining undecomposed initiator. This latter process presents serious problems. Because of the highly exothermic nature of the gelling and curing steps, control and reproducibility are extremely difficult to achieve when using an initiator containing only like free radical generating structures.

EXAMPLE I

Preparation of 4-Ethoxycarbonylazo-4-cyanopentyl 4-t-Butylazo-4-cyanovalerate stirred overnight. The next morning the aqueous layer was saturated with NaCl and extracted 3 times with $CH_2Cl_2$. The $CH_2Cl_2$ extracts were combined, dried over anhydrous $Na_2SO_4$, filtered and the $CH_2Cl_2$ stripped off. The yield was 12.3 g. (60%). The infrared spectrum was in agreement with the structure of 2-ethoxycarbonylhydrazo-2-cyano-5-hydroxypentane.

To a solution of 5.0 g. (.025 mole) of 2-ethoxycarbonylhydrazo-2-cyano-5-hydroxy-pentane and 4 g. of pyridine in 25 ml. of ether was added 5.5 g. (.025 mole) of 4-t-butylazo-4-cyanovaleryl chloride. The reaction was stirred an additional hour and poured into 50 ml. water. The ether layer was separated, washed 3 times with water, dried over anhydrous $Na_2SO_4$, filtered and the ether stripped off. The yield was 8.5 g. (85.5%). The infrared spectrum of the product was in agreement with the structure of 4-ethoxycarbonylhydrazo-4-cyanopentyl 4-t-butylazo-4-cyanovalerate.

The above hydrazo (8.5 g. or .0216 moles) was slurried in 25 ml. water in a 250 ml. round bottom flask, 50 ml. of $CH_2Cl_2$ added and the mixture cooled to 5°C. in an ice bath. Chlorine was passed into the mixture at approximately 0.3 g./minute until 1.6 g. (.0225 moles) was absorbed. The reaction was stirred an additional 15 minutes, the $CH_2Cl_2$ layer separated, washed once with water, twice with saturated $NaHCO_3$, once with saturated NaCl solution, dried over anhydrous $Na_2SO_4$, filtered and the $CH_2Cl_2$ stripped off. The yield was 6.55 g. (77.6%). The infrared spectrum of the product was in agreement with the structure of the desired product.

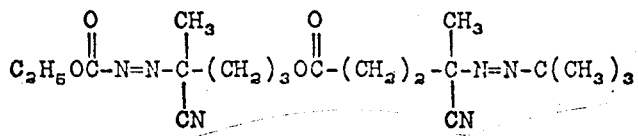

Formula I where: n = 1;

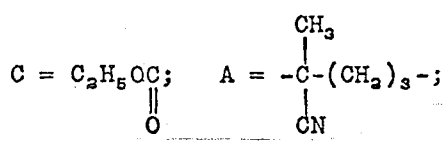

The azoester portion of the molecule has a 10 hour half-life at approximately 130°C. while the di-aliphatic azo portion has a 10 hour half-life at approximately 76°C.

EXAMPLE II

Preparation of 4-Carbamylazo-4-cyanopentyl 4-t-Butylazo-4-cyanovalerate

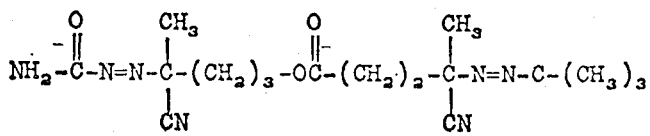

Formula I where: n = 1;

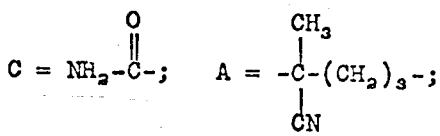

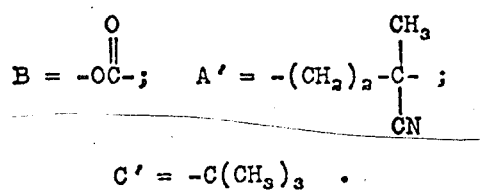

To a mixture of 10.4 g. (0.1 mole) of ethyl carbazate, 10.2 g. (0.1 mole) of 3-acetyl-1-propanol, 4.9 g. (0.1 mole) sodium cyanide and 40 ml. water was added 10 g. of concentrated $H_2SO_4$ diluted with 20 ml. water. The mixture immediately began to warm up. The flask was stoppered with a pressure release stopper and

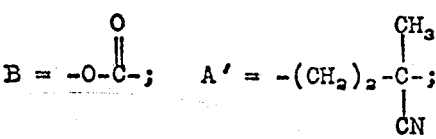

$C' = -C(CH_3)_3$ .

To a mixture of 5.9 g. (.0288 moles) of 2-ethoxycarbonylhydrazo-2-cyano-5-hydroxypentane (from Example I) 20 ml. water and 50 ml. chlorine, cooled to 10°C., was passed 4.5 g. (.05 mole) chlorine over 10 minutes. The reaction was stirred an additional 10 minutes, the CH₂Cl₂ layer separated, washed 4 times with 10% NaHCO₃ solution, once with saturated NaCl solution, dried over Na₂SO₄, filtered and the CH₂Cl₂ stripped off. The yield was 4.7 g. (81%) of a yellow liquid. The infrared spectrum of the product was in agreement with the structure of 2-ethoxycarbonylazo-2-cyano-5-hydroxypentane.

The above azoester was dissolved in 20 ml. ethanol, the solution cooled to 5°C. with an ice bath, and ammonia passed slowly through the solution until the exotherm ceased. The reaction was stirred an additional one-half hour and poured into 50 ml. water. The water was extracted 3 times with 50 ml. portions of CH₂Cl₂, the CH₂Cl₂ layers combined, washed once with 50 ml. saturated NaCl solution, dried over anhydrous Na₂SO₄, filtered and the CH₂Cl₂ stripped off. The yield was 2.2 g. (55%) of a viscous yellow liquid. The infrared spectrum of the product was in agreement with the structure of 2-carbamylazo-2-cyano-5-hydroxypentane.

The 2-carbamylazo-2-cyano-5-hydroxypentane (2.2 g. or 0.0126 moles) was dissolved in 20 ml. of ether containing 2 ml. of pyridine. The solution was cooled to 15°C. and 2.9 g. (0.0126 moles) of 4-t-butylazo-4-cyanovaleryl chloride was added dropwise. The reaction was stirred one-half hour after the addition was over, poured into 25 ml. water and the ether layer separated. The ether layer was washed with 5% HCl, water, 10% NaHCO₃ solution, saturated NaCl colution, dried over anhydrous Na₂SO₄, filtered and the ether stripped off. The yield was 4.6 g. (80%). The crude product was purified by chromatographing it over alumina using benzene as the eluent. The infrared spectrum of the purified product was in agreement with the structure of 4-carbamylazo-4-cyanopentyl 4-t-butylazo-4-cyanovalerate. The material assayed 77% by iodometric analysis.

The azoformamide portion of the molecule has a 10 hour half-life at approximately 110°C. and the di-aliphatic azo portion has a 10 hour half-life at approximately 76°C.

EXAMPLE III

Preparation of the Ester from 2-hydroxyethyl t-Butylazocarboxylate and 4-t-Butylazo-4-cyanovaleryl Chloride

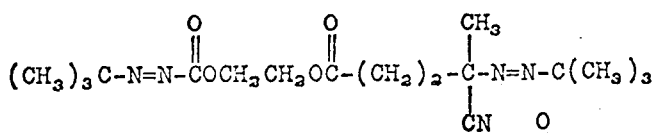

Formula I where: $n = 1$; $C = (CH_3)_3C-$; $A = -\overset{O}{\overset{\|}{C}}OCH_2CH_2-$;

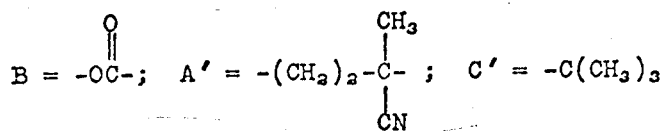

A mixture of 5 g. (0.0567 moles) of t-butylhydrazine and 5 g. (0.0567 moles) of ethylene carbonate were heated for 7 hours in an oil bath at 50°–55°C. and allowed to cool overnight. The resultant product weighed 10.0 g. (100%). An infrared spectrum of the product was in agreement with the structure of 2-hydroxyethyl t-butylhydrazocarboxylate.

To a solution of 10.0 g. (.0567 moles) of 2-hydroxyethyl t-butylhydrazocarboxylate and 4 g. of pyridine in 50 ml. of ether was added 14 g. (0.06 moles) of 4-t-butylazo-4-cyanovaleryl chloride, controlling the addition rate to maintain a gentle reflux of the ether. The reaction was stirred an additional 3 hours and then poured into 50 ml. water. The ether layer was separated and poured into a 100 ml. r.b. flask, 20 ml. water added and then 4 g. (0.0567 moles) of chlorine was passed into the reaction mixture holding the temperature below 20°C. with an ice bath. The reaction was stirred an additional 15 minutes, the ether layer separated, washed once with water, twice with 10% NaHCO₃, once with saturated NaCl solution, dried over anhydrous sodium sulfate, filtered and the ether stripped off. The yield was 15.6 g. (75%) of a yellow liquid. The indrared spectrum was in agreement with the structure of the desired product. The material assayed 98% by iodometric analysis.

The azoester portion of the molecule has a 10 hour half-life at approximately 130°C. and the di-aliphatic azo portion has a 10 hour half-life at approximately 76°C.

EXAMPLE IV

Preparation of the Ester from N-(2-Hydroxyethyl)-t-butylazoformamide and 4-t-Butylazo-4-cyanovaleric acid

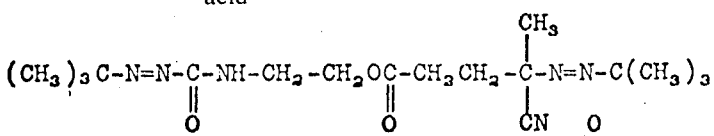

Formula I where: $n = 1$; $C = (CH_3)_3C-$; $A = -\overset{O}{\overset{\|}{C}}-NH-CH_2-CH_2-$;

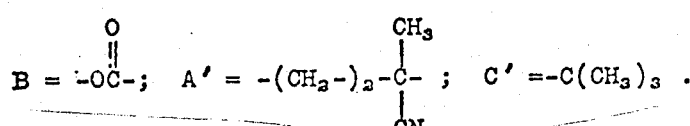

To a solution of 10.2 g. (0.0595 moles) of isopropyl t-butylazocarboxylate in 50 ml. ethanol, cooled to 0°C., was added 3.62 g. of ethanolamine holding the temperature below 10°C. The reaction was stirred an additional hour and then the ethanol was stripped off. The yield was 10.3 g. (100%) of a yellow liquid which assayed 92% by an iodometric analysis as N-2-hydroxyethyl-t-butylazoformamide.

To a solution of 5 g. (0.029 moles) of the above N-2-hydroxyethyl-t-butylazoformamide and 8 g. of pyridine in 50 ml. ether was added 7 g. (0.03 moles) of 4-t-butylazo-4-cyanovaleryl chloride, controlling the addition rate to maintain a gentle reflux of the ether. The reaction was stirred an additional 3 hours and then poured into 25 ml. water. The ether layer was separated, washed once with 5% HCl, with 10% NaHCO₃, saturated NaCl solution, dried over anhydrous Na₂SO4, filtered and the ether stripped off. The yield was 10.3 g. (98%) of a viscous yellow liquid. The infrared spectrum was in agreement with that of the desired product.

The azoformamide portion of the molecule has a 10 hour half-life at approximately 110°C. while the dialiphatic azo portion has a 10 hour half-life at approximately 76°C.

EXAMPLE V

Preparation of the Ester from 2-Phenylazo-2-cyano-5-hydroxypentane and 4-t-Butylazo-4-cyanovaleric acid dium hydroxide, 4.6 g. (0.065 moles) of chloride and 60 ml. water] was slowly added. The temperature slowly rose from 20° to 36°C. and was maintained there with a cold water bath until the exotherm subsided. The bath was removed and the temperature slowly dropped back to room temperature over 2 hours. The reaction was then allowed to stir overnight. The next morning the CH₂Cl₂ layer was separated, washed with water, 5% HCl, twice with saturated NaHCO₃ solution, once with saturated NaCl solution, dried, filtered and the methylene chloride stripped off. The yield was 8.4 g. (82%) of a dark liquid. The infrared spectrum was in agreement with the structure of 2-phenylazo-2-cyano-5-hydroxypentane.

To a solution of 5.4 g. (0.0249 moles) of 2-phenylazo-2-cyano-5-hydroxypentane and 2.2 g. (0.0275 moles) of pyridine in 25 ml. ether was added 6.0 g. (0.026 moles) of 4-t-butylazo-4-cyanovaleryl chloride maintaining the temperature around 15°C. with a cold water bath. The reaction was stirred for an additional hour and poured into 50 ml. water. The ether layer was separated, washed with 5% HCl, saturated NaHCO₃ solution, saturated NaCl solution, dried over anhydrous sodium sulfate filtered and the ether evaporated. The crude product was chromatographed over alumina and eluted with benzene. The yield was 7.5 g. (73%) of a dark liquid. The infrared spectrum of the product was in agreement with that of the desired

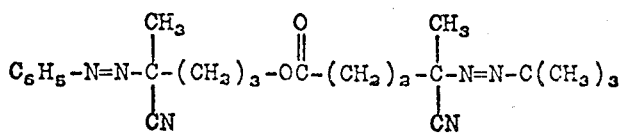

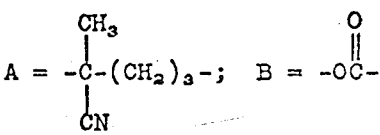

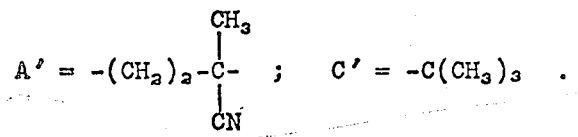

A solution of 9.0 g. (0.047 moles) of the phenylhydrazone of 3-acetyl-1-propanol in 15 ml. of HCN was allowed to stand in a pressure bottle for 1 week at room temperature. The contents were poured into ice water and the organic layer taken up in 75 ml. CH₂Cl₂. The CH₂Cl₂ layer was washed with saturated NaHCO₃ solution, and saturated NaCl solution. The CH₂Cl₂ solution was then placed in a 250 ml. round bottom flask and a NaOCl solution [prepared from 6 g. (0.15 moles) of soproduct.

The phenylazo linkage has a 10 hour half-life at approximately 130°C. while the t-butylazo linkage has a 10 hour half-life at approximately 76°C.

EXAMPLE VI

Preparation of the Diester from 2,2'-Azobis(1-hydroxy-2-methylpropane) and 4-t-Butylazo-4-cyanovaleryl chloride

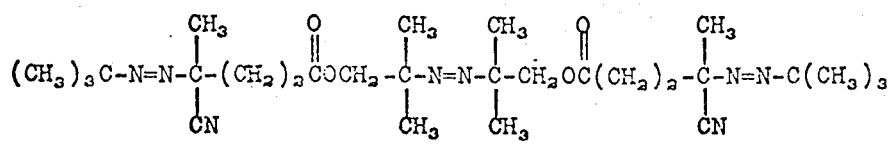

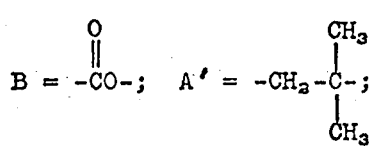

To a solution of 3.4 g. (0.0195 moles) of 2,2'-azobis(1-hydroxy-2-methylpropane) and 8 g. of pyridine in 50 ml. ether, cooled to 10°C., was added 10 g. (0.0435 moles) of 4-t-butylazo-4-cyanovaleryl chloride. After the addition was over, the reaction was stirred an additional 4 hours at room temperature. The reaction mixture was poured into water, the ether layer separated, washed once with 5% HCl to remove the excess pyridine, twice with 5% KOH at 5°C., once with 5% HCl, followed by 10% NaHCO$_3$ and saturated sodium chloride solution. The ether solution was dried over anhydrous sodium sulfate, filtered and the ether evaporated. The yield was 8.3 g. or 81%. The product was a viscous oil whose infrared spectrum was in agreement with that of the desired product.

The material was purified by column chromatography over alumina and eluting the product with pentane. A solid was obtained which had a melting point of 61°-63°C. after recrystallization from cyclohexane-pentane.

The external azo linkages have a 10 hour half-life at approximately 76°C. while the internal azo linkage has a 10 hour half-life at approximately 160°C.

EXAMPLE VII

Preparation of 2,2'-Azobis[2-(4-t-butylazo-4-cyanovaleroyloxy)-4-methylpentane]

To a solution of 7.2 g. (.031 moles) of sodium 4-t-butylazo-4-cyanovalerate in 40 ml. of absolute methanol, cooled to 5°C. in an ice bath, was added 4.01 g. (.015 moles) of 2,2'-azobis(2-chloro-4-methylpentane) dropwise over 10 minutes. After the addition was complete, the reaction was stirred an additional one-half hour and poured into 200 ml. of ice water. The organic layer was extracted with pentane, the pentane layer washed with saturated NaHCO$_3$ solution, saturated NaCl solution, dried over anhydrous sodium sulfate, filtered and the pentane stripped off. The yield was 4.9 g. (53%) of a light yellow liquid, whose infrared spectrum was in agreement with that of the desired product.

The two azonitrile portions of the molecule have 10 hour half-lives at approximately 76°C. while the symmetrical azo-valerate portion of the molecule has a 10 hour half-life at approximately 120°C.

EXAMPLE VIII

Preparation of Di-(1-t-butylazo-1,3-dimethylbutyl) 4,4'-Azobis(4-cyanovalerate)

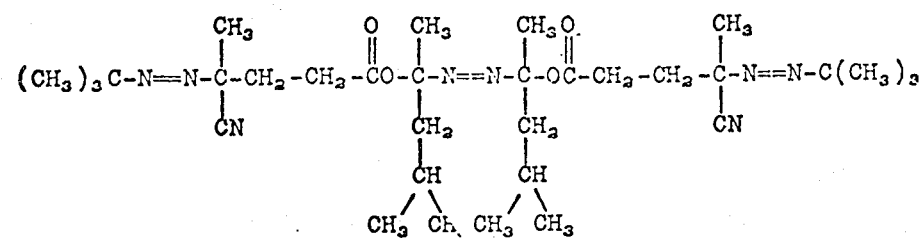

Formula I where: n = 2; C = (CH$_3$)$_3$C—;

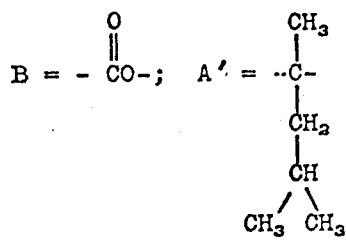

B = —$\overset{O}{\overset{\|}{C}}$O—;  A' = 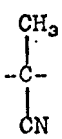

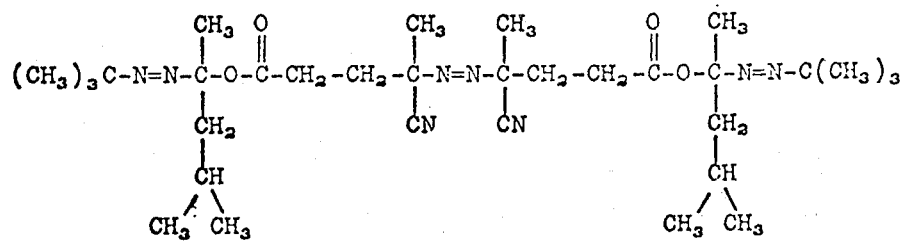

Formula I where: n = 2; C = $(CH_3)_3C-$; A = 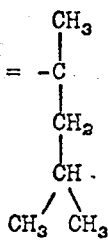

B = $-O\overset{O}{\underset{\|}{C}}-$; A' = $-CH_2-CH_2-\underset{\underset{CN}{|}}{\overset{\overset{CH_3}{|}}{C}}-$ To a solution of 3.2 g. (.01 moles) of disodium 4,4'-azobis (4-cyanovalerate) in 25 ml. of absolute methanol, cooled to 5°C. in an ice bath, was added 4.1 g. (.02 moles) of 2-t-butylazo-2-chloro-4-methylpentane dropwise over 10 minutes. After the addition was complete, the reaction was stirred an additional one-half hour and poured into 200 ml. of ice water. The organic layer was extracted with pentane, the pentane layer washed with saturated NaHCO₃ solution, saturated NaCl solution, dried over anhydrous sodium sulfate, filtered and the pentane stripped off. The yield was 3.3 g. (54%) of a light yellow liquid, whose infrared spectrum was in agreement with that of the desired product.

The symmetrical azonitrile portion of the molecule has a 10 hour half-life at approximately 65°C. while the two azo-valerate portions have 10 hour half-lives of approximately 120°C.

EXAMPLE IX

Preparation of 1-t-Butylazo-1,3-dimethylbutyl 4-t-butylazo-4-cyanovalerate cooled to 5°C. in an ice bath, was added 4.1 g. (.020 moles) of 2-t-butylazo-2-chloro-4-methylpentane dropwise over 10 minutes. After the addition was complete the reaction was stirred an additionaal one-half hour and poured into 200 ml. of ice water. The organic layer was extracted with pentane, the pentane layer washed with saturated NaHCO₃ solution, saturated NaCl solution, dried over anhydrous sodium sulfate, filtered and the pentane stripped off. The yield was 5.4 g. (71.7%) of a light yellow liquid, whose infrared spectrum was in agreement with that of the desired product.

The azonitrile portion of the molecule has a 10 hour half-life at approximately 76°C. while the azo-valerate portion of the molecule has a 10 hour half-life at approximately 120°C.

EXAMPLE X

Preparation of the Di Ester from N-(2-hydroxyethyl)-t-

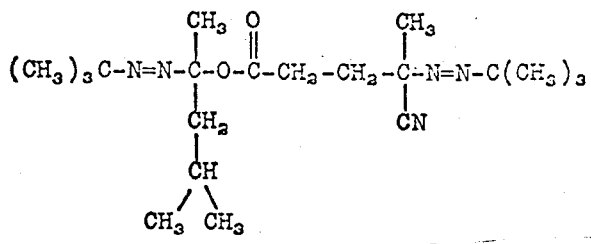

Formula I where: n = 1; C = $(CH_3)_3C-$; A = 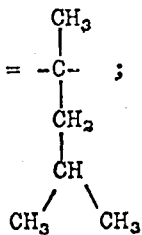

B = $-O\overset{O}{\underset{\|}{C}}-$;  A' = $-(CH_2)_2-\underset{\underset{CN}{|}}{\overset{\overset{CH_3}{|}}{C}}-$ ; C' = $-C(CH_3)_3$ To a solution of 4.7 g. (.0201 moles) of sodium 4-t-butylazo-4-cyanovalerate in 25 ml. methanol, butylazoformamide and Trans-4,4'-Azobis(4-cyanovaleryl chloride)

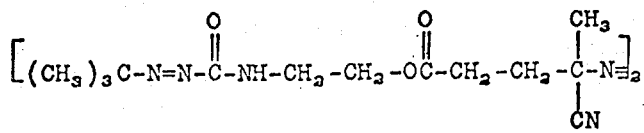

Formula I where: n = 2; C = (CH$_3$)$_3$C-; A = -C(=O)-NH(CH$_2$)$_2$-;

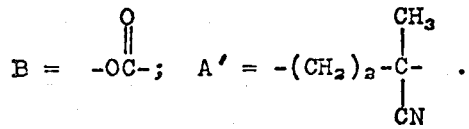 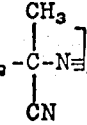

B = -OC(=O)-; A' = -(CH$_2$)$_2$-C(CH$_3$)(CN)-.

To a solution of 5.7 g. (.018 moles) of trans-4,4'-azobis(4-cyanovaleryl chloride) and 6 ml. pyridine in 30 ml. of ether was added 6.22 g. (.036 moles) of N-(2-hydroxyethyl)-t-butylazoformamide dissolved in 5 ml. of ether. The alcohol was added over 5 minutes maintaining a gentle reflux. After the addition was complete the reaction was refluxed gently for 15 minutes and then cooled down. The product was insoluble in ether so methylene chloride was added until the product went back into solution. The methylene chloride solution was washed with cold water, 5% HCl, saturated NaHCO$_3$ solution, saturated NaCl solution dried over anhydrous Na$_3$SO$_4$, filtered and the solvent evaporated off. The yield was 5.6 g. (74.6%) of a dark yellow viscous liquid whose infrared spectrum was in agreement with that of the desired product.

The two azoformamide portions of the molecule have 10 hour half-lives at approximately 110°C. while the symmetrical azonitrile portion of the molecule has a 10 hour half-life at approximately 65°C.

EXAMPLE XI

Preparation of the Di Ester from 2-Hydroxyethyl t-Butylazocarboxylate and Cis-4,4'-Azobis(4-cyanovaleryl chloride)

in 25 ml. of ether was added 5.25 g. (0.0302 moles) of 2-hydroxyethyl t-butylazocarboxylate dissolved in 5 ml. of ether. The alcohol was added over 5 minutes maintaining a gentle reflux. After the addition was complete the reaction was refluxed gently for an additional 1½ hours and the pyridine hydrochloride filtered off. The ether filtrate was washed with water 5% HCl, cold water, 10% NaHCO$_3$ solution and saturated NaCl solution. The ether solution was dried over Na$_2$SO$_4$, filtered and the ether stripped off. The yield was 5.0 g. (79.3%) of a dark yellow viscous liquid whose infrared spectrum was in agreement with that of the desired product.

The two azo ester portions of the molecule have 10 hour half-lives at approximately 130°C. while the symmetrical azonitrile portion of the molecule has a 10 hour half-life at approximately 65°C.

EXAMPLE XII

Preparation of the Di Ester from 2-Ethoxycarbonylazo-2-cyano-5-hydroxypentane and Trans-4,4'-Azobis(4-cyanovaleryl chloride)

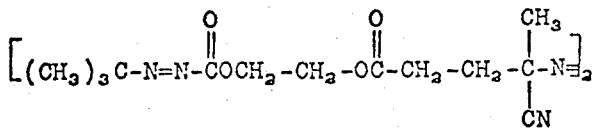 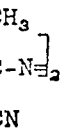

Formula I where: n = 2; C = (CH$_3$)$_3$C-; A = -COCH$_2$-CH$_3$; B = -OC(=O)-;

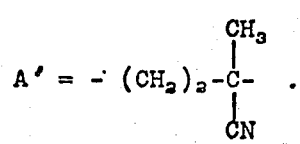

A' = -(CH$_2$)$_2$-C(CH$_3$)(CN)-.

To a solution of 4.78 g. (.0151 moles) of cis-4,4'-azobis(4-cyanovaleryl chloride) and 5 ml. of pyridine

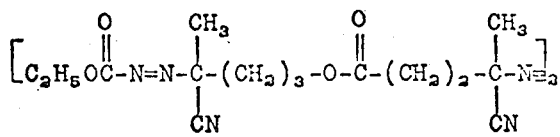

Formula I where: n = 2; C = $C_2H_5OC-$; A = $-\underset{CN}{\underset{|}{C}}-(CH_2)_3-$; B = $-OC-$;

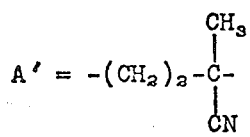

To a solution of 8.20 g. (0.04 moles) of 2-ethoxycarbonylazo-2-cyano-5-hydroxypentane (prepared as in Example II) and 5 ml. of pyridine in 50 ml. $CH_2Cl_2$ was added 6.32 g. (0.02 moles) of trans-4,4'-azobis(4-cyanovaleryl chloride) holding the temperature at 25°C. ± 50°C. The reaction was stirred for an additional 3 hours and poured into water. The $CH_2Cl_2$ solution was washed with 5% HCl and then with water until neutral. The $CH_2Cl_2$ solution was dried over anhydrous sodium sulfate, filtered and the $CH_2Cl_2$ removed on a rotating evaporator leaving 12.8 g. (98% yield) of a yellow viscous liquid whose infrared spectrum was in agreement with that of the desired product.

The two azo ester portions of the molecule have 10 hour half-lives at approximately 130°C. while the symmetrical azonitrile portion of the molecule has a 10 hour half-life at approximately 65°C.

EXAMPLE XIII

Preparation of the Di Ester from 2-Phenylazo-2-cyano-5-hydroxypentane and Trans-4,4'-Azobis(4-cyanovaleryl chloride)

Example V) and 4 ml. of pyridine in 25 ml. of benzene was added 5.1 g. (.0162 moles) of trans-4,4'-azobis(4-cyanovaleryl chloride) holding the temperature at 25°C. ± 50°C. The reaction was stirred an additional 3 hours and the pyridine hydrochloride filtered off. The benzene filtrate was washed with 5% HCl and then with water until neutral. The benzene solution was dried over anhydrous sodium sulfate, filtered and the benzene removed on a rotating evaporator leaving 10.9 g. (99% yield) of a brown viscous liquid whose infrared spectrum was in agreement with that of the desired product.

The two phenyl azo portions of the molecule have 10 hour half-lives at approximately 130°C. while the symmetrical azonitrile portion of the molecule has a 10 hour half-life at approximately 65°C.

EXAMPLE XIV

Block Copolymerization of Styrene and Methyl Methacrylate with the Sequential Azo Initiator of Example III A. Preparation of an Azo-Containing Polystyrene from the Ester of 2-Hydroxyethyl t-

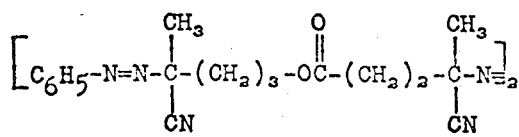

Formula I where: n = 2; C = $C_6H_5-$; A = $-\underset{CN}{\underset{|}{C}}-(CH_2)_3-$;

B = $-OC-$; A' = $-(CH_2)_2-\underset{CN}{\underset{|}{C}}-$ .

To a solution of 7.0 g. (0.0323 moles) of 2-phenylazo-2-cyano-5-hydroxypentane (prepared as in Butylazocarboxylate and 4-t-Butylazo-4-cyanovaleryl Chloride of Example III:

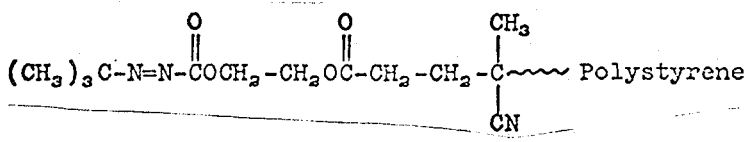

A mixture of 10 g. of styrene and 1 g. of the sequential azo initiator of Example III was heated at 76°C. under nitrogen for 5½ hours. The cooled reaction mixture was precipitated in methanol. The resultant polymer was dissolved in benzene and reprecipitated from methanol twice. The purified azo containing polymer weighed 8.9 g.

B. Preparation of a Polystyrene-Poly(methyl methacrylate) Block Copolymer from the Azo-Containing Polystyrene of A:

A mixture of 2 g. of methyl methacrylate and 1 g. of the azo-containing polystyrene of A was heated for 2 hours at 130°C. in a sealed tube under nitrogen. The cooled reaction mixture was precipitated in methanol. The resultant polymer was dissolved in benzene and reprecipitated from methanol twice. The dried product weighed 3 g.

To a 13% solution of the homopolymers in chloroform [1 part polystyrene and 1 part poly(methyl methacrylate)] was added 1 part of the block copolymer of B and the mixture shaken up. The resultant solution did not demix into two layers in 52 hours. This compares to a demixing time of 45 minutes for the same homopolymer solution without the block copolymer.

EXAMPLE XV

Block Copolymerization of Styrene and Methyl Methacrylate with the Sequential Azo Initiator of Example I A. Preparation of an Azo-Containing Polystyrene from 4-Ethoxycarbonylazo-4-cyanopentyl 4-t-Butylazo-4-cyanovalerate of Example I:

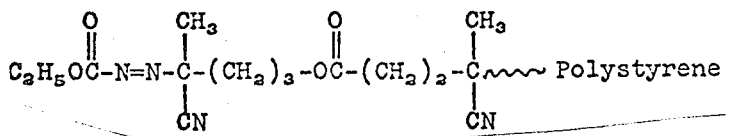

A mixture of 10 g. of styrene and 1 g. of the sequential azo initiator of Example I was heated at 76°C. under nitrogen for 5½ hours. The cooled reaction mixture was precipitated in methanol. The resultant polymer was dissolved in benzene and reprecipitated from methanol twice. The purified azo containing polymer weighed 8.0 g.

B. Preparation of a Polystyrene-Poly(methyl methacrylate) Block Copolymer from the Azo-Containing Polystyrene of A:

A mixture of 2 g. of methyl methacrylate and 1 g. of the azo-containing polystyrene of A was heated for 2 hours at 130°C. in a sealed tube under nitrogen. The cooled reaction mixture was precipitated in methanol. The resultant polymer was dissolved in benzene and reprecipitated from methanol twice. The dried product weighed 3 g.

To a 13% solution of the homopolymers in chloroform [1 part polystyrene and 1 part poly(methyl methacrylate)] was added 1 part of the block copolymer of B and the mixture shaken up. The resultant solution did not demix in 9 days. This compares to a demixing time of 45 minutes for the same homopolymer solution without the block copolymer.

EXAMPLE XVI

Block Copolymerization of Styrene and Methyl Methacrylate with the Sequential Azo Initiator of Example XIII A. Preparation of an Azo-Containing Polystyrene from the Di-ester of 2-Phenylazo-2-cyano-5-hydroxypentane and trans-4,4'-Azobis(4-cyanovaleryl chloride) of Example XIII:

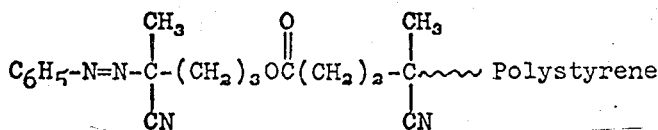

A mixture of 10 g. of styrene and 1 g. of the sequential azo initiator of Example XIII was heated at 65°C. under nitrogen for 7 hours. The cooled reaction mixture was precipitated in methanol. The resultant polymer was dissolved in benzene and reprecipitated from methanol twice. The purified azo-containing polymer weighed 7.25 g.

B. Preparation of a Polystyrene-Poly(methyl methacrylate Block Copolymer from the Azo-Containing Polystyrene of A:

A mixture of 4 g. of methyl methacrylate and 2 g. of the azo-containing polystyrene of A was heated for 1 hour at 130°C. in a sealed tube under nitrogen. The cooled reaction mixture was precipitated in methanol. The resultant polymer was dissolved in benzene and reprecipitated from methanol twice. The dried product weighed 5.6 g.

To a 13% solution of the homopolymers in chloroform [1 part polystyrene and 1 part poly(methyl methacrylate)] was added 1 part of the block copolymer of B and the mixture shaken up. The resultant mixture demixed in 16 hours. This compares to a demixing time of 45 minutes for the same homopolymer solution without the block copolymer

EXAMPLE XVII

Block Copolymerization of Styrene and Methyl Methacrylate with the Sequential Azo Initiator of Example XII A. Preparation of an Azo-Containing Polystyrene from the Di-ester of 2-Ethoxycarbonylazo-2-cyano-5- hydroxypentane and trans-4,4'-Azobis(4-cyanovaleryl chloride) of Example XII:

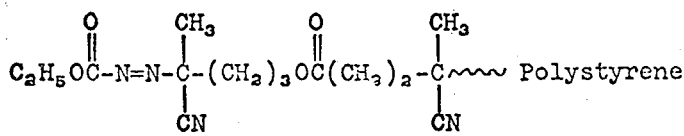

A mixture of 10 g. of styrene and 1 g. of the sequential azo initiator of Example XII was heated at 65°C. under nitrogen for 9.5 hours. The cooled reaction mixture was precipitated in methanol. The resultant polymer was dissolved in benzene and reprecipitated from methanol twice. The purified azo-containing polymer weighed 6.0 g.

B. Preparation of a Polystyrene-Poly(methyl methacrylate) Block Copolymer from the Azo-Containing Polystyrene of A:

A mixture of 2 g. of methyl methacrylate and 1 g. of the azo-containing polystyrene of A was heated for 2.5 hours at 130°C. in a sealed tube under nitrogen. The cooled reaction mixture was precipitated in methanol. The resultant polymer was dissolved in benzene and reprecipitated from methanol twice. The dried product weighed 3.0 g.

To a 13% solution of the homopolymers in chloroform [1 part polystyrene and 1 part poly(methyl methacrylate) ] was added 1 part of the block copolymer of B and the mixture shaken up. The resultant mixture did not demix in 4 days. This compares to a demixing time of 45 minutes for the same homopolymer solution without the block copolymer.

EXAMPLE XVIII

Block Copolymerization of Styrene and Methyl Methacrylate with the Sequential Azo Initiator of Example XII A. Preparation of an Azo-Containing Poly(methyl methacrylate) from the Di-ester of 2-Ethoxycarbonylazo-2-cyano-5-hydroxypentane and trans-4,4'-Azobis(4-cyanovaleryl chloride) of Example XII:

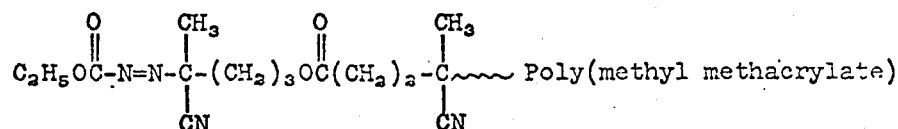

A mixture of 5 g. of methyl methacrylate and 0.5 g. of the sequential azo initiator of Example XII was heated 1 hour at 65°C. under nitrogen. The cooled reaction mixture was precipitated in methanol. The resultant polymer was dissolved in benzene and reprecipitated in methanol twice. The purified azo-containing polymer weighed 4.1 g.

B. Preparation of a Polystyrene-Poly(methyl methacrylate) Block Copolymer from the Azo-Containing Poly(methyl methacrylate) of A:

A mixture of 2 g. of styrene and 1 g. of the azo-containing poly(methyl methacrylate) of A was heated for 2.5 hours at 130°C. in a sealed tube under nitrogen. The cooled reaction mixture was precipitated in methanol. The resultant polymer was dissolved in benzene and reprecipitated from methanol twice. The dried product weighed 1.5 g.

To a 13% solution of the homopolymers in chloroform [3 g. polystyrene and 3 g. poly(methyl methacrylate) ] was added 0.39 g. of the block copolymer of B and the mixture shaken up. The resultant mixture did not demix in 4 days. This compares to a demixing time of 45 minutes for the same homopolymer solution without the block copolymer.

EXAMPLE XIX

Gelling of a Polyester Resin and Subsequent Post Curing of the Resin by a Sequential Azo Initiator A. Preparation of 4-t-butylazo-4-hydroxypentyl 4-t-butylazo-4-cyanovalerate

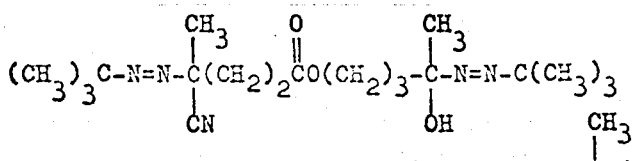

Formula I where: $n = 1$; $C = (CH_3)_3C-$; $A = -\underset{CN}{\underset{|}{C}}-(CH_2)_2-$;

$B = -\underset{\underset{||}{O}}{C}O-$; $A' = -(CH_2)_3-\underset{OH}{\underset{|}{C}}-\underset{CH_3}{\overset{|}{}}$; $C' = (CH_3)_3C-$.

To a solution of 8.6 (.05 m) of the t-butylhydrazone of 1-acetyl-3-propanol and 4.0 g. (.05 m) of pyridine in 25 ml. of benzene was added 11.5 g. (0.05 m) of 4-t-butylazo-4-cyanovaleryl chloride. The addition was carried out 5°–10°C. and then the temperature was allowed to rise to 25°C. and the reaction stirred an additional hour. Water was then added to dissolve the pyridine hydrochloride and the benzene layer separated, washed twice with water, dried over anhydrous sodium sulfate, filtered and the benzene evaporated under reduced pressure. The yield was 14.1 g. (75%). The infrared spectrum was in agreement with that of the azo-hydrazone ester.

The above azo-hydrazone ester was dissolved in 25 ml. of pentane and the solution cooled to 5°C. To this solution was added 0.05 moles of a 10% solution of sodium hypochlorite. After the hypochlorite addition was over the reaction temperature was allowed to rise to room temperature and then was stirred overnight. The next morning the pentane layer was separated, washed twice with water (until neutral), dried over anhydrous sodium sulfate, filtered and the pentane evaporated under reduced pressure. The yield was 9.8 g. (69%). The infrared spectrum of the product was in agreement with that of 4-t-butylazo-4-hydroxypentyl 4-t-butylazo-4-cyanovalerate.

B. Gelling of polyester resin at room temperature and subsequent post curing of the resin at 100°C. with 4-t-butylazo-4-hydroxypentyl 4-t-butylazo-4-cyanovalerate.

An unsaturated polyester resin was made by reacting maleic anhydride (1.0 m), phthalic anhydride (1.0 m), and propylene glycol (2.2 m) until an acid number of 45–50 was obtained. To this was added hydroquinone at a 0.013% concentration. Seven parts of this unsaturated polyester was diluted with 3 parts of monomeric styrene to obtain a homogeneous blend having a viscosity of 13.08 poise and a specific gravity of 1.14.

To 25 grams of this blend was mixed 0.25 grams of 4-t-butylazo-4-hydroxypentyl 4-t-butylazo-4-cyanovalerate and the resultant mixture allowed to stand at room temperature (22°C.). The composition gelled in 4 minutes but did not cure. The resin was subsequently cured to a hard thermoset by placing it in a 100°C. oven.

Thus having described the invention what is claimed is:

1. An azo compound of the formula:

$$(C-N=N-A-B-A'-N\!\!=\!)_2$$

where:
a. C is selected from

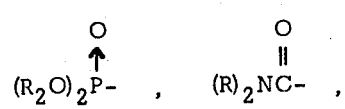

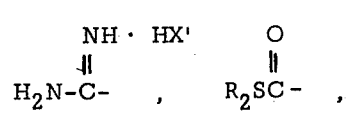

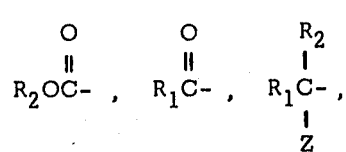

and aryl of 6–12 carbons;
b. A and A' are the same, when A and C are different, or are different, when A and C are the same or different, and are selected from

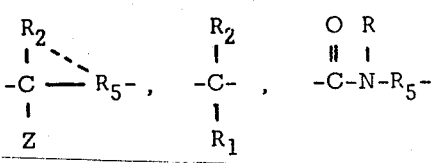

and —C(=O)OR$_5$—, the "C" in each group being directly attached to an azo group;
c. B is selected from

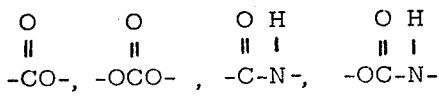

and a direct bond;
d. X' is an inorganic anion;
e. the Zs are separately selected from
—CN, —Cl, —Br, —N$_3$,
—OCN, —SCN, —R$_1$,

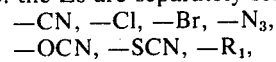

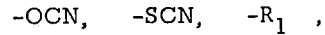

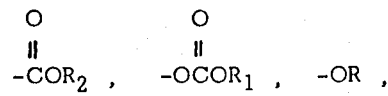

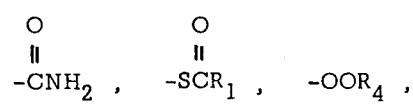

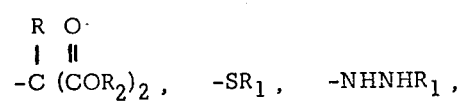

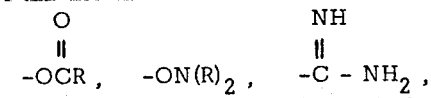

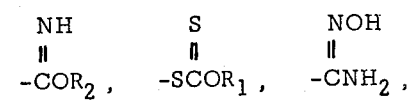

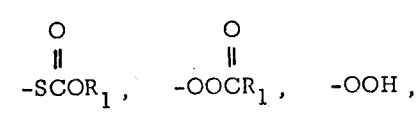

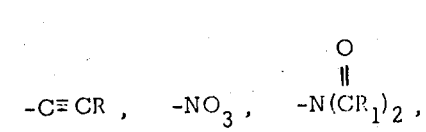

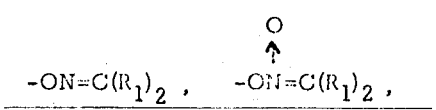

and

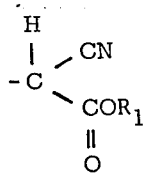

f. the Rs are separately selected from hydrogen, lower alkyl of 1–6 carbons, and aryl of 6–12 carbons;
g. The $R_1$s are separately selected from lower alkyl of 1–6 carbons or aryl of 6–12 carbons;
h. The $R_2$s are separately selected from lower alkyl of 1–6 carbons;
i. $R_4$ is t-alkyl of 4–12 carbons;
j. $R_5$ is alkylene of 1–12 carbons; and
k. $R_2$ and $R_5$, when taken together with the tertiary carbon linked to Z, form cycloalkyl of 5–8 carbons.

2. An azo compound as in claim 1 where B is —C(O)O— and A and A′ are —C($R_2$) (Z)$R_5$—.

3. 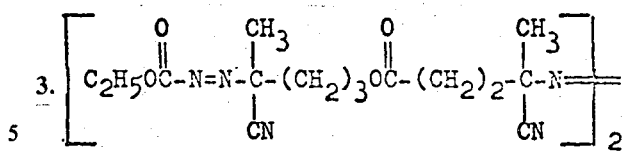

4. 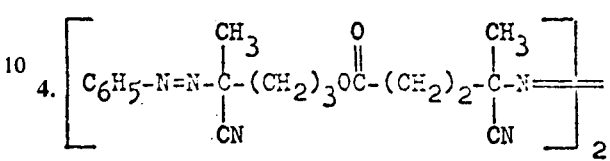

5. 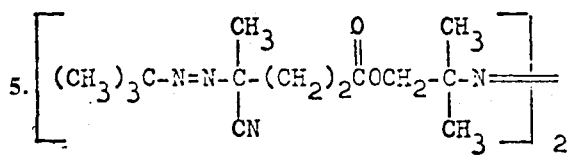

* * * * *